United States Patent [19]

Karlsson et al.

[11] Patent Number: 4,649,774
[45] Date of Patent: Mar. 17, 1987

[54] REVERSIBLE TORQUE CONVERTER

[75] Inventors: Per J. Karlsson; Nils E. Sundström, both of Södertälje, Sweden

[73] Assignee: Norbar Torque Tools Ltd., England

[21] Appl. No.: 652,842

[22] Filed: Sep. 21, 1984

[30] Foreign Application Priority Data

Oct. 4, 1983 [SE] Sweden ............................... 8305438

[51] Int. Cl.⁴ .............................................. F16H 3/74
[52] U.S. Cl. ...................................................... 74/751
[58] Field of Search ............... 74/751, 750; 192/56 R; 464/88

[56] References Cited

U.S. PATENT DOCUMENTS

| | | | |
|---|---|---|---|
| 2,753,965 | 7/1956 | Kaman | 192/56 R X |
| 3,187,860 | 6/1965 | Simmons | 74/751 X |
| 3,257,877 | 6/1966 | Ulrich et al. | 74/751 X |
| 3,430,521 | 3/1969 | Kulman | 192/56 R X |
| 3,718,054 | 2/1973 | Perkins et al. | 74/751 |
| 3,787,136 | 1/1974 | Steiner | 192/56 R X |
| 4,041,729 | 8/1977 | Bilz | 192/56 R X |
| 4,046,030 | 9/1977 | Suzuki | 464/88 |
| 4,215,594 | 8/1980 | Workman, Jr. et al. | 74/751 |

FOREIGN PATENT DOCUMENTS

| | | | |
|---|---|---|---|
| 67183 | 6/1978 | Japan | 74/751 |
| 216218 | 10/1967 | Sweden | |
| 7905250 | 6/1979 | Sweden | |
| 8002416 | 10/1984 | Sweden | |

Primary Examiner—Leslie Braun
Assistant Examiner—David Novais
Attorney, Agent, or Firm—Ostrolenk, Faber, Gerb & Soffen

[57] ABSTRACT

The invention relates to a reversible torque converter which is intended as a auxiliary device for use in connection with pneumatic, electric and/or hand-operated tools or machines, or which is intended to be incorporated in such machines and tools as an integrated part thereof. The switching or change-over means comprises a radially acting coupling which includes a dogging plate (4) mounted on the input shaft (2), a dogging cage (8, 9) mounted on the output shaft (3), and coupling elements (23) which are active between the two dogging elements and which are arranged for movement between an inner position, corresponding to direct drive, and an outer position, corresponding to a gearing-down drive, when the outward shaft (3) is driven via a planetary gear system (7; 31, 32, 33; 34) which acts upon the coupling elements (8, 9). The coupling elements (23) are spring-biased (10, 11, 12) with a force which must be exceeded in order for a change over to take place.

14 Claims, 4 Drawing Figures

REVERSIBLE TORQUE CONVERTER

The present invention relates to a reversible torque converter which automatically switches from direct drive to gearing-down drive when a given torque is exceeded, and which comprises an input shaft, switching means, a gear arrangement, an output shaft, and a housing. The converter is intended for use as a separate auxiliary unit in the operation of pneumatic and electrical machines, hand-driven machines/tools, such as lifting tackle, torque spanners, or for incorporation in pneumatic and electrical machines or tools as an integral part thereof.

A torque converter can be designed for reversible operation, by including two output shafts which rotate in mutually opposite directions. Although this is a known and practiced solution, it results in complicated designs.

For example, when applied in connection with devices for tightening screw-thread connections or joints, it is desirous for the screw-threaded element to be turned rapidly to a clamping position, where an increase in torque is required. This can be effected by gearing-down the input rotary speed, the desired clamping force being achieved by torque conversion. Preferably, the arrangement is such that this gearing-down is arranged to take place automatically, in the absence of external impulses. In addition hereto, gearing-down should be controlled by the torque developed on the output shaft. Preferably, it shall be possible to adjust the setting of the torque at which gearing down takes place, by means of externally located devices.

A screw-joint tightening tool which includes automatic torque transmission and which can also operate in a reversible mode is known from a Swedish Patent Application No. 8002416-9). Although this tool functions satisfactorily, it becomes heavily worn when used for certain tasks, as a result of its structural design, with axial transmission and toothed or serrated coupling means, therewith shortening the useful life of the tool. This applied primarily when the tool is used for tapping screw holes with the aid of screw taps, and when reaming bores in which bearings are to be fitted, where the direction of rotation of the tool is momentarily reversed.

Consequently, one object of the invention is to provide a reversible torque converter which has a long useful life and which will permit the direction of rotation to be reversed rapidly, without reducing the efficiency of the converter.

The known arrangement employing axial transmission is also relatively long in length, and consequently cannot at times readily be incorporated in the tool or machine in question.

Consequently, a further object of the invention is to provide a reversible torque converter of small axial dimension which can be readily incorporated in said tool or machine.

These and other objects and advantages, hereinafter made apparent, are achieved in accordance with the invention by means of a torque converter of the kind described in the introduction, said torque converter being mainly characterized in that the switching means comprises a radially acting coupling which includes a dogging plate mounted on the input shaft and a dogging cage mounted on the output shaft, at least one coupling element arranged for movement between an inner position, in which the dogging plate drives the dogging cage via said coupling element, and an outer position, in which the dogging cage is driven by the gear arrangement via said coupling element, said coupling element being spring-biased to that transition from said inner position cannot take place until the torque developed on the output shaft exceeds forces exerted by the spring means acting upon the coupling element.

Further characteristic features of and advantages afforded by the present invention will be evident from the following detailed description of an embodiment of the invention, made with reference to the accompanying drawings, in which FIG. 1 is a partially sectioned side view of the torque converter according to the invention;

Figure 1:
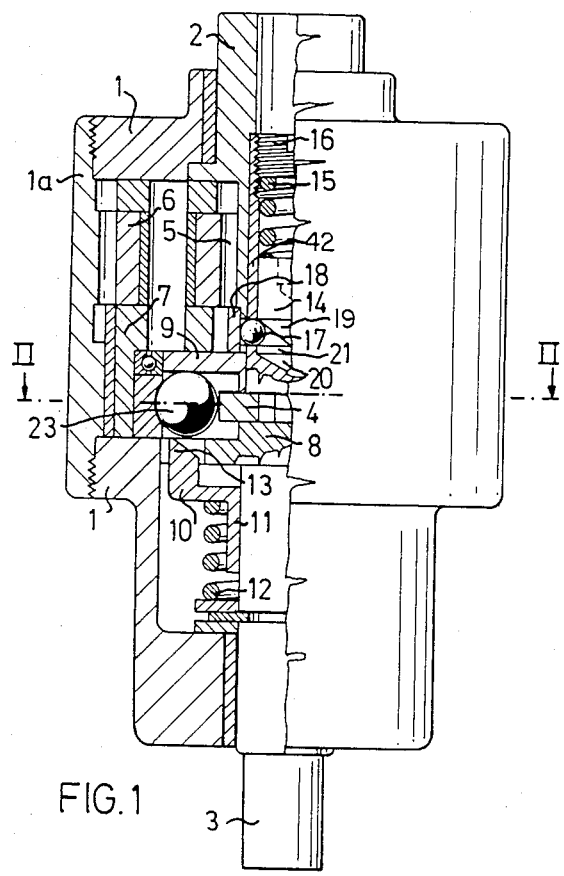

The torque converter illustrated in FIG. 1 is accommodated in a housing 1, 1a and includes an input shaft 2 and an output shaft 3. Arranged on the input shaft is a dogging plate 4, which forms part of the coupling means.

The input shaft 2 also serves as a sun wheel in a planetary gear system, comprising a toothed annulus 5 on the input shaft 2, a planet gear 6 and a planet holder 7, and a ring wheel arranged on the inside of the housing 1, 1a.

Mounted on the output shaft 3 is a dogging cage, which also forms part of the coupling means and which comprises two parts, 8, 9 joined together by means of screw joints or the like. The dogging plate rotates independently of the dogging cage, in between said two parts thereof.

Operating in conjunction with the two dogging elements, i.e. the plate and the cage, are coupling elements, which in the illustrated, preferred embodiment have the form of balls. The balls are acted upon by teeth 10 arranged on a sleeve 11, which runs on the output shaft 3. The sleeve 11, in turn, is acted upon by a spring element, such as a coil spring 12 for example. The setting of the spring element can be adjusted from without, for example by means of a screw. It is often preferable, however, to pre-set a suitable torque, and to exclude the possibility of making setting adjustments. The teeth 10 are chamferred to form a tip 13 located radially inwards on the extremities of respective teeth. The coupling elements are arranged to be urged radially inwards under the action of a spring force, the magnitude of which is determined substantially by the force exerted by the spring means. The tooth-tip 13 is arranged so as to lie radially outwards of the geometric or gravitational centre of the coupling element, even when said coupling element occupies its outermost position.

The manner in which the coupling means operates is hereinafter described more clearly with reference to FIG. 2.

For reasons hereinafter made apparent, a resilient unit or assembly is arranged in connection with the input shaft 2. A spring-biased insert 14 having a forward, conically tapering end is mounted in the end of the input shaft 2. The force exerted by the spring element 15 can be regulated by pre-tensioning said element with the aid of screw 16 for example. The load produced by spring element 15 shall be greater than the load exerted by the spring element 12 acting on the sleeve 11. Balls 17 are arranged in openings in the shaft 2 and corresponding openings in the sleeve-like part encircled by the shaft, this sleeve-like part being connected with the pin driving the dogging plate, and are held in position by means of a ring 18 encircling the input shaft. The conical forward end of the insert 14 urges the balls 17 against the ring 18. The cavity 19, which accommodates the insert 14, has a cup-shaped bottom 20, which together with the conically narrowing part of the insert 14 forms a confined space 21 into which the balls can be moved under the action of spring 15, upon relative movement between the input shaft and the dogging plate.

Figure 2:
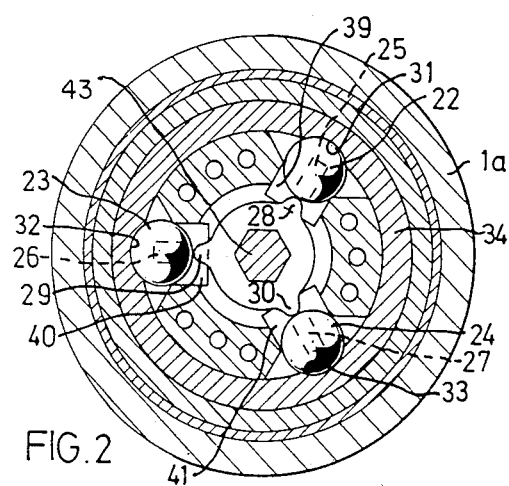
FIG. 2 is a cross-sectional view taken on the line II—II in FIG. 1.

FIG. 2 is a sectional view taken on the line II—II in FIG. 1, illustrating an embodiment which comprises three coupling elements in the form of balls 22, 23 and 24. The arrangement is shown with the balls in a high-torque position, i.e. when the input shaft drives the output shaft via the planetary gear system. The teeth 25, 26 and 27, shown in broken lines, have been pressed down against the action of spring 12, and the balls have been pressed by tongues 28, 29, 30 on the dogging plate 4 outwardly against a cup-shaped ring 34 which is connected with the planet holder 7 and which is provided with recesses 31, 32, 33 corresponding to the shape of the balls. In this case, the output shaft 3 is driven by the input shaft via the planet wheels 6, the planet holder 7, the ring wheel, the ring 34 and the balls 22, 23, 24 and the dogging cage 8,9.

In the direct drive mode, the tongues 28, 29, 30 of the dogging plate 4 drive the dogging cage 8, 9 via the balls 22, 23, 24, which are pressed by teeth 10 radially inwards into the bottom of the cavity 39, 40, 41 in the dogging cage. When the torque on the output shaft 3 exceeds the force of the spring element 12 acting upon the sleeve 11, the tongues 28, 29, 30 force the balls out, into the widened portion of the cavity 39, 40, 41 in the dogging cage. The balls are held in this outward position by the inclined surfaces defining the widened cavity. The inclined surfaces move the balls somewhat further, out towards the periphery, therewith providing a free-passage or clearance for the balls relative to the tongues of the dogging plate.

The aforedescribed resilient unit has significance when the balls move from an inner to an outer position. As will be seen from the figure, a ball may become located in a position in which it is locked in a 0-position between two corners and the tongue of the dogging plate. When such a so-called 0-position is reached, the torque converter becomes fully locked. The aforedescribed resilient unit avoids the risk of malfunctioning of the torque converter. When the ball occupies the 0-position, the torque exceeds the pre-set force exerted by the spring element 15, the input shaft rotates relative to the dogging plate, and the balls are urged into the free space. As a result of this relative movement, the coupling elements, the balls, are released and pass to their respective outer positions, where they are held by the torque developed on the output shaft, until this torque falls beneath the load exerted by the spring element acting upon the sleeve carrying the teeth which act upon the balls.

Figure 3:
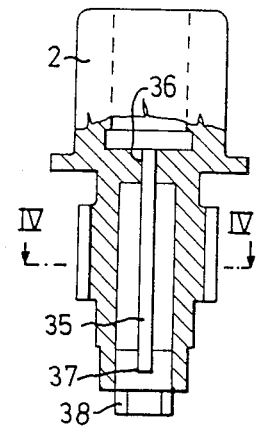
FIG. 3 illustrates an alternative embodiment of the input shaft of the torque converter according to FIG. 1.

FIG. 3 illustrates an alternative embodiment of the resilient unit. Instead of the spring-biased conical insert, there is provided a torsion rod 35, the upper end 36 of which is mounted in the input shaft 2 and the lower end 37 of which is anchored in a pin 38 which drives the dogging plate. In other respects, the resilient unit of the FIG. 3 embodiment operates in a manner similar to that of the previously described resilient unit.

Figure 4:
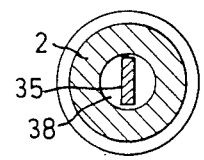
FIG. 4 is a cross-sectional view taken on the line IV—IV in FIG. 3.

The cross-sectional view shown in FIG. 4 and taken on the line IV—IV in FIG. 3, illustrates the manner in which the torsion rod is mounted in the pin 38.

One disadvantage with the embodiment of FIGS. 3 and 4 is that the torsion rod is constantly under load, and therewith also slightly twisted or distorted. The important advantage, however, lies in the structural simplicity, and therewith the saving in weight which such an embodiment affords.

As will be understood, the structural design of the torque converter can be changed in many respects within the scope of the invention. For example the spring element need not necessarily have the form of a coil spring, but may have the form of a gas spring, or may comprise an elastomeric material, etc. Further, the coupling elements may have the form of rollers, instead of balls. In this case, however, the accommodating surfaces of the dogging elements must conform to the shape of the rollers. In itself, it is more difficult to guide rollers than to guide balls, although in the case of rollers the resistance to wear is greater than in the case of balls. A cup-spring construction can also be envisaged as a suitable wear-resistant alternative.

One important advantage afforded by the torque converter according to the invention lies primarily in substantially frictionless operation, a substantially frictionless change-over or switch-over, a substantially lengthened useful life, and in the fact that the converter is able to take up very large loads. Another important advantage includes the limited space requirements of the converter, and the possibility of connecting up a plurality of converters in series.

A further important advantage is that the torque converter can be designed for mutually different torque stages, for example transmission ratios of 1:5, 1:13, 1:18 etc. In this way, a machine with a low input torque, i.e. a torque of about 10 kp, can be used to draw even very high torques, e.g. torques of 180 kp. By using a plurality of separate torque converters, one and the same machine can be used for practically all work.

Finally, it can be mentioned that the losses experienced with the torque converter reach only 4–8%, while the losses experienced with known torque converters reach from 20–40%.

We claim:

1. A reversible torque converter which switches automatically from direct drive to gearing-down drive when a given torque is exceeded, and which comprises:
 a housing;
 an input shaft;
 switching means;
 gear means; and
 an output shaft characterized in that said switching means includes a radially acting coupling which having a dogging plate mounted on said input shaft and a dogging cage mounted on said output shaft; at least two coupling elements having a spring therein, said coupling elements arranged for movement between an inner position, wherein said dogging cage is driven by said dogging plate via said coupling elements, and an outer position in which said dogging cage is driven by said gear means via said coupling elements, said coupling elements being spring-biased by said spring such that a transition from said inner position to said outer position can only take place when the torque developed by said output shaft exceeds the load exerted by said spring acting upon said coupling element wherein said dogging plate is provided with tongues between which said coupling elements rest under the action of said spring force in their inner position in that said dogging cage comprises an upper and a lower part which are firmly joined together and encircle in none engaging contact with said dogging plate and which are provided with cavities for accomodating said coupling elements having an inner part conforming to the shape of said coupling element and an outer widened part into which said coupling elements are urged by said tongues of said dogging plate when said torque on said output shaft exceeds said spring force.

2. A torque converter according to claim 1, characterized in that said spring can be adjusted externally of said housing.

3. A torque converter according to claim 2, characterized in that said spring is a coil spring wherein the length of said spring is adjustable by means of an externally located screw.

4. A torque converter according to claim 1, characterized in that said spring element acts upon a sleeve having teeth thereon, said sleeve mounted on said output shaft (3) for axial movement therealong, said teeth being arranged so as to act upon said coupling element wherein said coupling element is in the form of spherical balls.

5. A reversible torque converter which switches automatically from direct drive to gearing-down driven when a given torque is exceeded, and which comprises:
 a housing;
 an input shaft;
 switching means;
 gear means; and
 an output shaft characterized in that said switching means includes a radially acting coupling which having a dogging plate mounted on said input shaft and a dogging cage mounted on said output shaft;
 at least one coupling element having a spring therein, said coupling element arranged for movement between an inner position, wherein said dogging cage is driven by said dogging plate via said coupling element, and an outer position in which said dogging cage is driven by said gear means via said coupling element, said coupling element being spring-biased by said spring such that a transition from said inner position to said outer position can only take place when the torque developed by said output shaft exceeds the load exerted by said spring acting upon said coupling element and wherein said gear means comprises a planetary gear system including a ring which is connected to a planet holder and which is provided with recesses for accommodating the coupling element, which in the outer position are driven by said ring and in turn drive said dogging cage.

6. A torque converter according to claim 5, characterized in that said spring can be adjusted externally of said housing.

7. A torque converter according to claim 6, characterized in that said spring is a coil spring wherein the length of said spring is adjustable by means of an externally located screw.

8. A torque converter according to claim 5, characterized in that the gear means comprises a planetary gear system including a ring which is connected to a planet holder and which is provided with recesses for accommodating the coupling element, which in the outer position are driven by said ring and in turn drive said dogging cage.

9. A torque converter according to claim 5, characterized in that said spring element acts upon a sleeve having teeth thereon, said sleeve mounted on said output shaft for axial movement therealong, said teeth being arranged so as to act upon said coupling element wherein said coupling element is in the form of spherical balls.

10. A reversible torque converter which switches automatically from direct drive to gearing-down drive when a given torque is exceeded, and which comprises:
 a housing;
 an input shaft;
 switching means;
 gear means; and
 an output shaft characterized in that said switching means includes a radially acting coupling which having a dogging plate mounted on said input shaft and a dogging cage mounted on said output shaft;
 at least one coupling element having a spring therein, said coupling element arranged for movement between an inner position, wherein said dogging cage is driven by said dogging plate via said coupling element, and an outer position in which said dogging cage is driven by said gear means via said coupling element, said coupling element being spring-biased by said spring such that a transition from said inner position to said outer position can only take place when the torque developed by said output shaft exceeds the load exerted by said spring acting upon said coupling element,
 a resilient unit arranged between said input shaft and dogging plate; and
 wherein said resilient unit comprises a spring-biased insert which is mounted in said input shaft and which has a conical forward end, a driven pin connected to sleeve-like part which is coupled to said input shaft and has a cup-shaped lower portion, and openings arranged respectively in said sleeve-like part and said input shaft, said openings being in line with one another and having arranged therein balls which are held in position by firstly a ring, which is mounted on the outside of said input shaft and covers said openings, and secondly by said conical forward end of said spring-biased insert.

11. A torque converter according to claim 10, characterized in that said spring can be adjusted from externally of said housing.

12. A torque converter according to claim 11, characterized in that said spring is a coil spring wherein the length of said spring is adjustable by means of an externally located screw.

13. A torque converter according to claim 10 characterized in that the gear means comprises a planetary gear system including a ring which is connected to a planet holder and which is provided with recesses for accommodating the coupling element, which in the outer position are driven by said ring and in turn drive said dogging cage.

14. A torque converter according to claim 10, characterized in that said spring element acts upon a sleeve having teeth thereon, said sleeve mounted on said output shaft for axial movement therealong, said teeth being arranged so as to act upon said coupling element wherein said coupling element is in the form of spherical balls.

* * * * *